3 Sheets--Sheet 1.

J. EDSON.
Steering Apparatus.

No. 148,432. Patented March 10, 1874.

Witnesses:
John R. Heard.
Jos C Torrey

Inventor:
Jacob Edson
by A Van Andrew atty

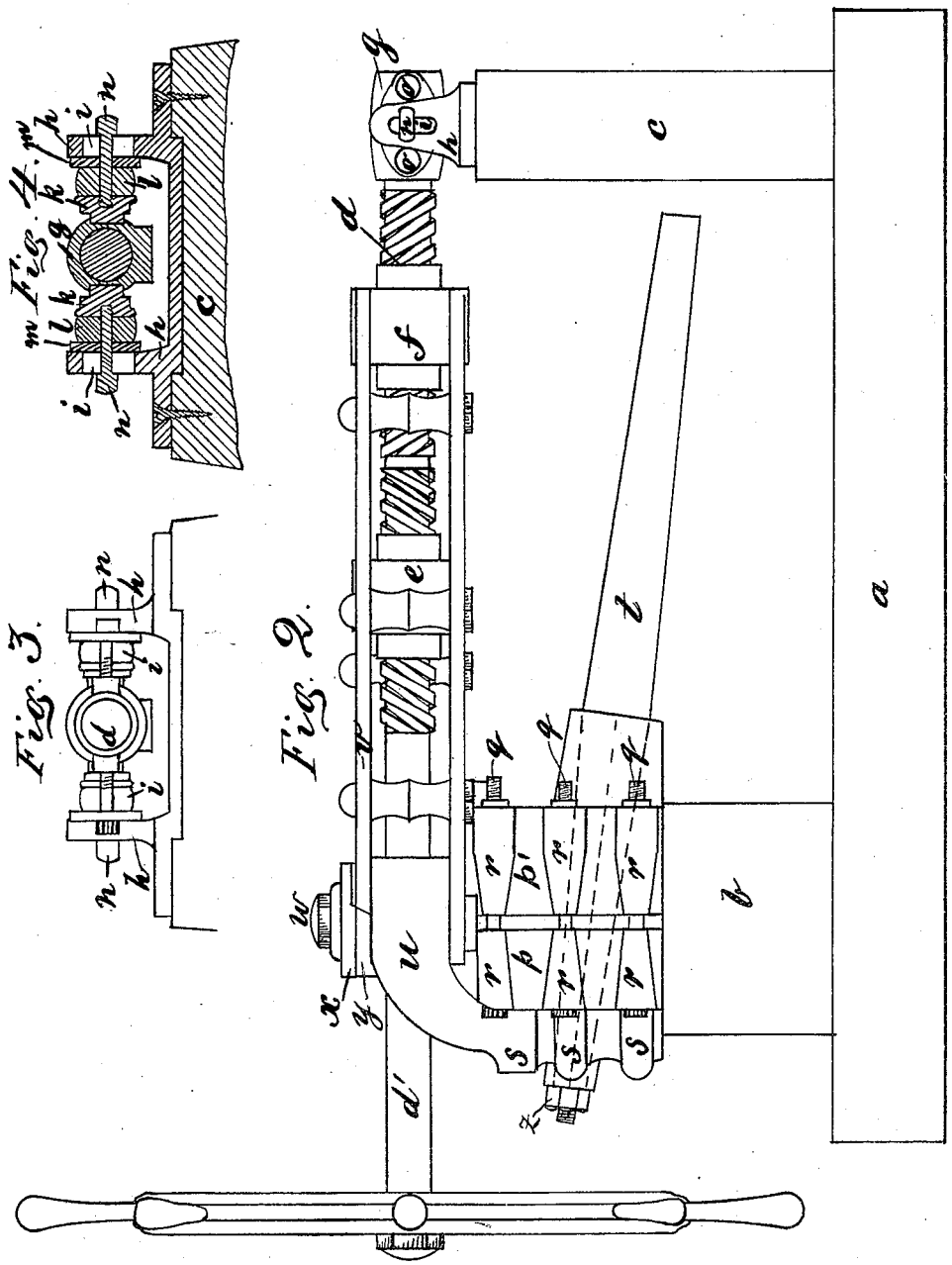

3 Sheets--Sheet 3.

J. EDSON.
Steering Apparatus.

No. 148,432. Patented March 10, 1874.

Witnesses:
John R. Heard
Jos. C. Torrey

Inventor:
Jacob Edson
by Alban Andrén
atty.

ated PATENT OFFICE.

UNITED STATES PATENT OFFICE.

JACOB EDSON, OF BOSTON, MASSACHUSETTS.

IMPROVEMENT IN STEERING APPARATUS.

Specification forming part of Letters Patent No. 148,432, dated March 10, 1874; application filed June 24, 1873.

*To all whom it may concern:*

Be it known that I, JACOB EDSON, of Boston, in the county of Suffolk and State of Massachusetts, have invented certain new and useful Improvements in Steering Apparatus; and I do hereby declare the following to be a full, clear, and exact description of the invention, such as will enable others skilled in the art to which it pertains to make and use it, reference being had to the accompanying drawings, which form part of this specification.

My invention relates to improvements in steering apparatus for sailing-vessels or steamers, consisting in the employment of an elastic and adjustable bearing for the right-and-left-handed screw, for the purpose of guarding off too heavy blows that may be imparted to the operating-screw by the waves striking the rudder. The rudder-stock is provided with a metallic head made in two halves, having strong horizontal ribs, and provided with ears for the holding-bolts. The connecting-links from the nuts to the rudder-stock are attached to strong curved arms made in one piece with the one-half of the metallic head; and, lastly, the cross-bar between the curved arms of the metallic head is provided in each end with a semicircular rib, for the purpose of preventing the connecting-links from a too rigid attachment to the said curved arms, as will now be more fully shown and described.

Figure 1:
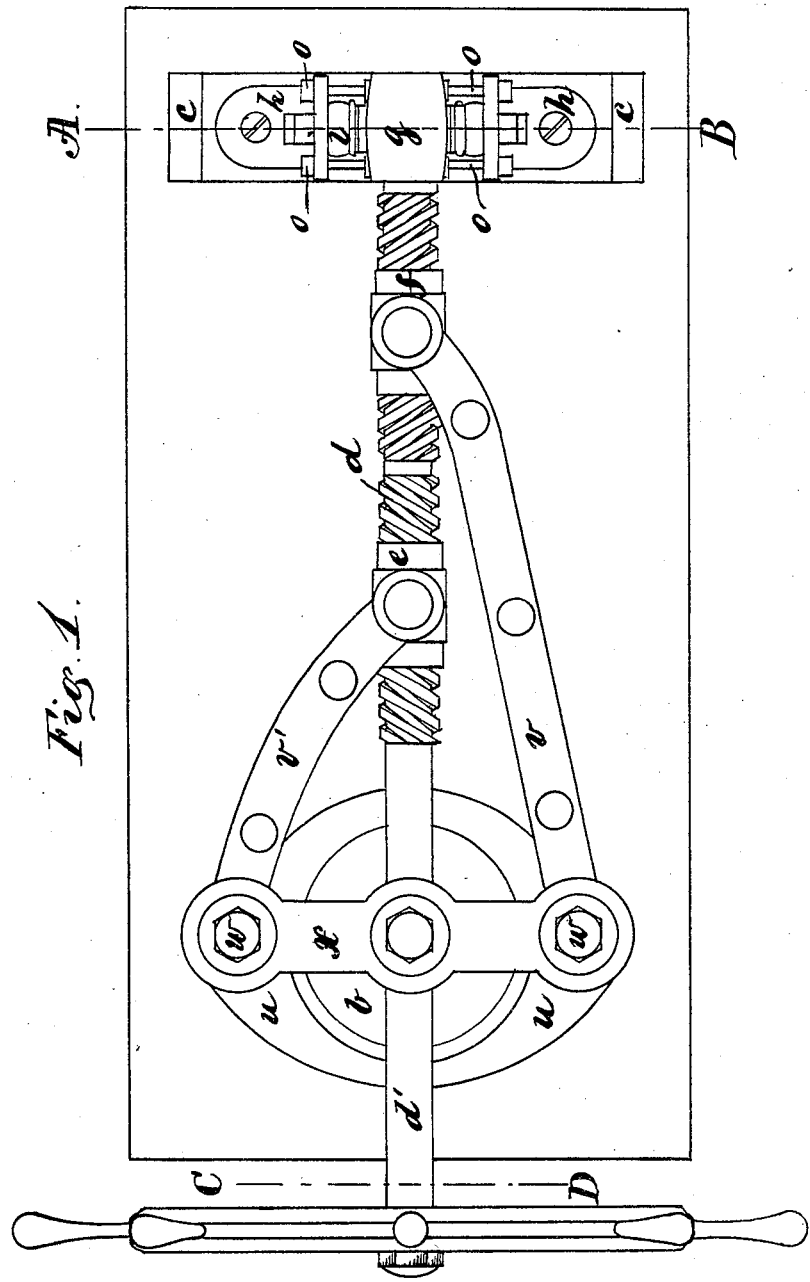
Figure 5:
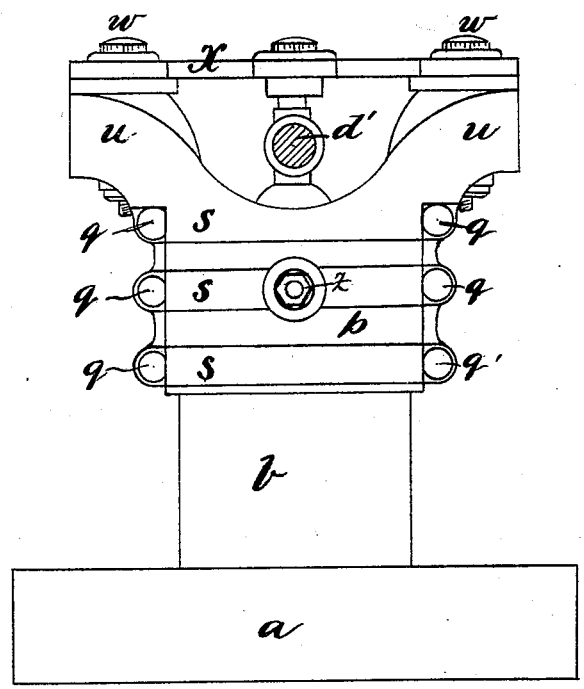

On the drawings, Figure 1 represents a ground plan. Fig. 2 represents a side elevation. Fig. 3 represents an end view of the rear bearing for the right-and-left-handed screw. Fig. 4 represents a cross-section on the line A B, shown in Fig. 1; and Fig. 5 represents a cross-section on the line C D, also shown in Fig. 1.

Similar letters refer to similar parts wherever they occur on the drawing.

$a$ represents the deck of a vessel; $b$, the rudder-stock, and $c$ the standard for the rear bearing of the operating-screw, in the usual manner. $d$ is the right-and-left-handed screw, provided with the nuts $e$ and $f$, in the ordinary way. $g$ represents a bearing for the screw $d$. The said bearing is hung in a metallic support, $h\ h$, having slot-holes $i\ i$, as shown in Fig. 4. The bearing $g$ is provided, on two opposite sides, with suitable recesses, in which rest the metallic nuts $k\ k$. An elastic washer, $l$, made of india-rubber or suitable elastic material, is placed between each of the nuts $k\ k$ and the metallic plates $m\ m$, as shown in Fig. 4. A bolt, $n$, projects through each slot-hole $i\ i$, metallic plates $m\ m$, elastic washers $i\ i$, and is tapped in the metallic nuts $k\ k$, by which arrangement the bearing $g$ is allowed to move freely up and down. For the purpose of allowing the said bearing to move sidewise, and at the same time exert the pressure on both elastic washers $l\ l$ at once, I have screw-bolts $o\ o\ o\ o$ projecting through holes in the plates $m\ m$, and tapped in opposite sides of the bearing $g$, as fully shown in Fig. 1, by which arrangement the bearing $g$ is allowed to give a little sidewise when the waves strike the rudder. The supports $h\ h$ may be made in one piece with the standard $c$, or attached thereto by means of screws or bolts, as shown in the drawings. To the upper part of the rudder-stock $b$ is firmly secured the metallic head, made in two halves, $p$ and $p'$, as shown, that are clasped firmly around the rudder-stock by means of screw-bolts $q\ q\ q$ going through ears $r\ r\ r$, as fully shown in Figs. 2 and 5. Strong projecting ribs $s\ s\ s$ run horizontally between the ears $r\ r\ r$, whereby great strength, combined with lightness, is obtained in the construction of the halves $p\ p'$. A tapering inclined hole is made through the halves $p\ p'$ as well as through the rudder-stock $b$, in which is inserted an auxiliary arm, $t$, inclining toward the deck in its rear end, as shown, to which may be attached suitable ropes and pulleys, so as to work the rudder therewith in case the screw apparatus should get out of order. Strong curved arms $u\ u$ are made in one piece with the half metallic head $p$, by which arrangement the head can be turned around its center at a suitable angle to the line of the screw $d$ without interfering with the screw-shaft $d'$. The ends of the curved arms $u\ u$ are connected to the double links $v\ v'$ by means of screw-bolts $w\ w$. The cross-bar $x$ is provided on the under side in each end with a semicircular rib, $y$, of a thickness a little larger than the thickness of the links $v$ $v'$, so as to obtain an easy and free motion for the said links around the bolts $w$ $w$ without much friction. The auxiliary arm $t$ projects through a tapering hole made through both the metallic halves $p$ $p'$ and the rudder-stock $b$, and is held firmly in its place by means of a nut, $z$, or its equivalent, in its extreme end, as shown in Fig. 2, by which the metallic head $p$ $p'$ is held firmly in its proper place on the rudder-stock $b$, as well as drawing the halves $p$ $p'$ firmer together.

Having thus fully described the nature, construction, and operation of my invention, I wish to secure by Letters Patent, and claim—

The arrangement for allowing the bearing $g$ of a steering apparatus to adjust itself in a horizontal or inclined plane, consisting of the nuts $k$ $k$, resting in recesses on the bearing $g$, elastic washers $l$ $l$, plates $m$ $m$, and the bolts $o$ $o$ $o$ $o$, as herein set forth, and for the purpose described.

In testimony that I claim the foregoing I have hereunto set my hand this 19th day of June, 1873.

JACOB EDSON.

Witnesses:
 ALBAN ANDRÉN,
 JOHN R. HEARD.